(12) United States Patent
Kuang (10) Patent No.: US 10,235,764 B2
(45) Date of Patent: Mar. 19, 2019

(54) METHOD, TERMINAL, AND STORAGE MEDIUM FOR DETECTING COLLISION BETWEEN COLLIDERS IN REAL-TIME VIRTUAL SCENE

(71) Applicant: TENCENT TECHNOLOGY (SHENZHEN) COMPANY LIMITED, Shenzhen (CN)

(72) Inventor: Xini Kuang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/797,202

(22) Filed: Oct. 30, 2017

(65) Prior Publication Data
US 2018/0053311 A1 Feb. 22, 2018

Related U.S. Application Data

(63) Continuation of application No. PCT/CN2016/082931, filed on May 20, 2016.

(30) Foreign Application Priority Data

Nov. 30, 2015 (CN) .......................... 2015 1 0860807

(51) Int. Cl.
*G06K 9/00* (2006.01)
*G06T 7/246* (2017.01)
(Continued)

(52) U.S. Cl.
CPC .............. *G06T 7/246* (2017.01); *G06T 7/12* (2017.01); *G06T 7/13* (2017.01); *G06T 7/50* (2017.01);
(Continued)

(58) Field of Classification Search
CPC .. G06T 7/246; G06T 7/12; G06T 7/50; G06T 7/13; G06T 7/70; G06T 7/60;
(Continued)

(56) References Cited

U.S. PATENT DOCUMENTS 6,747,651 B1   6/2004  Tan et al.
6,862,026 B2 * 3/2005  Zachmann ............. B25J 9/1664
                                                    345/419
(Continued)

FOREIGN PATENT DOCUMENTS

CN     101593366 A    12/2009
CN     102368280 A     3/2012
(Continued)

OTHER PUBLICATIONS

Sünkel, M. "Collision detection for cylinder-shaped rigid bodies." Student thesis, Lehrstuhl für Informatik 10 (2010).*

(Continued)

*Primary Examiner* — Jonathan S Lee
(74) *Attorney, Agent, or Firm* — Anova Law Group, PLLC (57) ABSTRACT

A method for collision detection between colliders in a real-time virtual scene includes: obtaining a shortest distance from a cylindrical collider corresponding to a virtual object to each plane of a first binary space partitioning collider in a virtual scene; extending each plane of the first binary space partitioning collider according to the shortest distance to form a second binary space partitioning collider; extending an axis-aligned bounding box of the first binary space partitioning collider to generate an outer edge-extended bounding box; obtaining an intersection set of the generated outer edge-extended bounding box and the second binary space partitioning collider; and performing collision detection between the cylindrical collider and a result of obtaining the intersection set of the outer edge-extended bounding box and the second binary space partitioning collider.

20 Claims, 8 Drawing Sheets

(51) Int. Cl.
*G06T 19/00* (2011.01)
*G06T 7/50* (2017.01)
*G06T 7/13* (2017.01)
*G06T 7/70* (2017.01)
*G06T 7/60* (2017.01)
*G06T 13/20* (2011.01)
*G06T 7/12* (2017.01)
*G06T 3/20* (2006.01)

(52) U.S. Cl.
CPC .............. *G06T 7/60* (2013.01); *G06T 7/70* (2017.01); *G06T 13/20* (2013.01); *G06T 19/00* (2013.01); *G06T 3/20* (2013.01); *G06T 2210/12* (2013.01); *G06T 2210/21* (2013.01)

(58) Field of Classification Search
CPC ........... G06T 13/20; G06T 19/00; G06T 3/20; G06T 2210/12; G06T 2210/21
See application file for complete search history.

(56) References Cited

U.S. PATENT DOCUMENTS

| | | | | |
|---|---|---|---|---|
| 2010/0318332 | A1* | 12/2010 | Faure | G06T 19/00 703/2 |
| 2016/0321381 | A1* | 11/2016 | English | G06F 17/5009 |
| 2018/0060459 | A1* | 3/2018 | English | G06F 17/5009 |

FOREIGN PATENT DOCUMENTS

| | | |
|---|---|---|
| CN | 102509317 A | 6/2012 |
| CN | 102609992 A | 7/2012 |
| CN | 102663825 A | 9/2012 |
| CN | 103729877 A | 4/2014 |
| CN | 105488851 A | 4/2016 |
| KR | 20130072465 A | 7/2013 |
| KR | 20140108087 A | 9/2014 |

OTHER PUBLICATIONS

The World Intellectual Property Organization (WIPO) International Search Report for PCT/CN2016/082931 dated Aug. 17, 2016 5 Pages (including translation).

The State Intellectual Property Office of the People's Republic of China (SIPO) Office Action 1 for 201510860807.7 dated Jan. 1, 2017 7 pages (including translation).

Tong-Hong Jin et al. Application of Collision Detection in a Large-Scale Virtual Environment. Journal of Engineering Graphics, 2007 No. 1 pp. 33-36.

Hai-Hong Pan et al. Collision Detection Algorithms Based on Separation Distance: A Survey. Journal of System Simulation. vol. 26 No. 7 Jul. 2014. pp. 1407-1416, 1447.

Korean Intellectual Property Office (KIPO) Office Action 1 for 10-2017-7035110 dated Dec. 20, 2018 9 pages (including translation).

* cited by examiner

METHOD, TERMINAL, AND STORAGE MEDIUM FOR DETECTING COLLISION BETWEEN COLLIDERS IN REAL-TIME VIRTUAL SCENE

RELATED APPLICATION

This application is a continuation application of PCT Patent Application No. PCT/CN2016/082931, filed on May 20, 2016, which claims priority to Chinese Patent Application No. 201510860807.7, filed with the Chinese Patent Office on Nov. 30, 2015 and entitled "METHOD AND APPARATUS FOR DETECTING COLLISION BETWEEN COLLIDERS IN REAL-TIME VIRTUAL SCENE", the entire content of both of which is incorporated herein by reference.

FIELD OF THE TECHNOLOGY

The present disclosure relates to the computer application field and, in particular, to a method, terminal, and storage medium for detecting collision between colliders in a real-time virtual scene.

BACKGROUND OF THE DISCLOSURE

Figure 1:
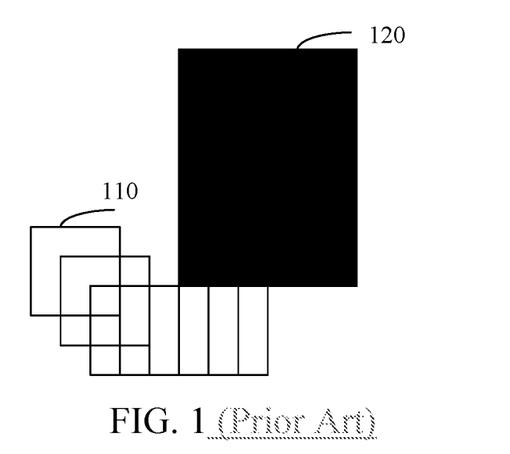
FIG. 1 is a schematic diagram of a conventional process of collision detection between colliders in a real-time virtual scene.

A virtual scene is a scene simulated by using a computer, for example, a game scene or an animation scene. Using a game scene as an example, when a virtual object encounters an obstacle, the virtual object needs to bypass the obstacle, that is, to avoid collision with the obstacle. A conventional processing manner is to simplify both the virtual object and the obstacle into colliders in an axis-aligned bounding box (AABB) form. As shown in FIG. 1, a collider 110 simplified from a virtual object needs to bypass a wall corner 120 and, according to a movement change process shown in the figure, the collider 110 needs to completely move out of the wall corner to further move forward along a lower edge of the wall.

However, the operator may feel the operation quite not fluent when the collider 110 collides with and bypasses the wall corner in such a manner, and the collider needs to be controlled to move its whole body out to bypass the wall corner, leading to low movement efficiency.

SUMMARY

In view of the above, it is desired to provide a method for collision detection between colliders in a real-time virtual scene, to improve operation fluency and to improve movement efficiency.

In addition, it is also desired to provide a terminal and a non-volatile computer readable storage medium, to improve operation fluency and improve movement efficiency.

A method for collision detection between colliders in a real-time virtual scene includes the following steps:

obtaining a shortest distance from a cylindrical collider corresponding to a virtual object to each plane of a first binary space partitioning (BSP) collider in a virtual scene;

extending each plane of the first BSP collider according to the shortest distance to form a second BSP collider;

extending an AABB of the first BSP collider to generate an outer edge-extended bounding box;

obtaining an intersection set of the generated outer edge-extended bounding box and the second BSP collider; and performing collision detection between the cylindrical collider and a result of obtaining the intersection set of the outer edge-extended bounding box and the second BSP collider.

A terminal includes a memory and a processor, the memory storing computer readable instructions for the processor, and the processor being configured for:

obtaining a shortest distance from a cylindrical collider corresponding to a virtual object to each plane of a first BSP collider in a virtual scene;

extending each plane of the first BSP collider according to the shortest distance to form a second BSP collider;

extending an AABB of the first BSP collider to generate an outer edge-extended bounding box;

obtaining an intersection set of the generated outer edge-extended bounding box and the second BSP collider; and performing collision detection between the cylindrical collider and a result of obtaining the intersection set of the outer edge-extended bounding box and the second BSP collider.

A non-transitory computer-readable storage medium storing computer executable instructions for, when executed by one or more processors, performing a method for collision detection between colliders in a real-time virtual scene, the method comprising:

obtaining a shortest distance from a cylindrical collider corresponding to a virtual object to each plane of a first BSP collider in a virtual scene;

extending each plane of the first BSP collider according to the shortest distance to form a second BSP collider;

extending an AABB of the first BSP collider to generate an outer edge-extended bounding box;

obtaining an intersection set of the generated outer edge-extended bounding box and the second BSP collider; and performing collision detection between the cylindrical collider and a result of obtaining the intersection set of the outer edge-extended bounding box and the second BSP collider.

Details of one or more embodiments of the present invention are provided in the following accompanying drawings and descriptions. Additional features, objectives, and advantages of the present disclosure will be apparent from the specification, accompanying drawings, and claims.

BRIEF DESCRIPTION OF THE DRAWINGS

To describe the technical solutions in the embodiments of the present invention or in the related technology more clearly, the following briefly describes the accompanying drawings required for describing the embodiments or the related technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely intended to explain the present disclosure but are not intended to limit the present disclosure.

Figure 2:
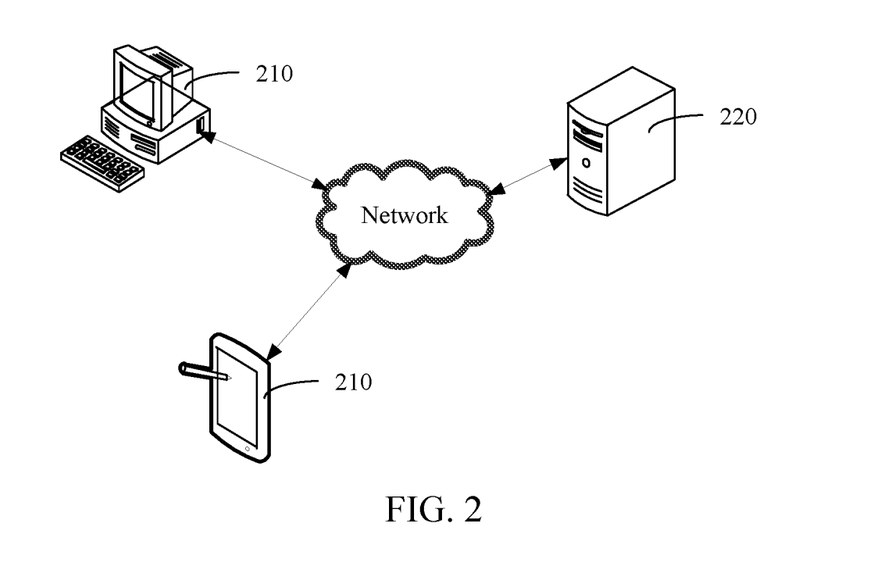
FIG. 2 is a schematic diagram of an application environment of a method and an apparatus for collision detection between colliders in a real-time virtual scene according to an embodiment.

FIG. 2 is a schematic diagram of an application environment of a method and an apparatus for collision detection between colliders in a real-time virtual scene according to an embodiment. As shown in FIG. 2, the application environment includes a terminal 210 and a server 220. There may be multiple terminals 210. The multiple terminals 210 communicate with the server 220. A method for collision detection between colliders in a real-time virtual scene may run on the terminal 210. The terminal 210 obtains data about a virtual scene from the server 220, obtains a first BSP collider and a cylindrical collider corresponding to a virtual object in the virtual scene, and performs collision detection between the first BSP collider and the cylindrical collider. The real-time virtual scene may be a real-time game scene or a real-time animation scene or the like. The virtual object may be a person or a substance. The first BSP collider may be a person or a substance or the like.

Figure 3A:
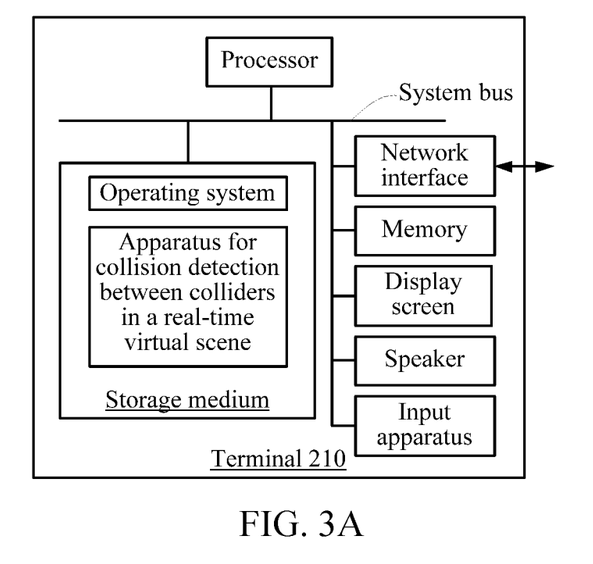
FIG. 3A is a schematic diagram of an internal structure of a terminal according to an embodiment.

FIG. 3A is a schematic diagram of an internal structure of the terminal 210 according to an embodiment. As shown in FIG. 3A, the terminal 210 includes a processor, a storage medium, a memory, a network interface, a sound collection apparatus, a display screen, a speaker, and an input apparatus that are connected by using a system bus. The storage medium of the terminal stores an operating system, and further includes an apparatus for collision detection between colliders in a real-time virtual scene. The apparatus for collision detection between colliders in a real-time virtual scene is configured to implement a method for collision detection between colliders in a real-time virtual scene. The processor is configured to provide computing and control capability, to support running of the entire terminal. The memory in the terminal provides a running environment for the apparatus for collision detection between colliders in a real-time virtual scene in the storage medium. The network interface is configured to perform network communication with the server, for example, send a data request to the server and receive corresponding data returned by the server. The display screen of the terminal may be a liquid crystal display screen or an e-ink display screen or the like. The input apparatus may be a touch layer covering the display screen, or may be a button, a trackball, or a touchpad disposed on a terminal housing, or may be an external keyboard, touchpad, or mouse or the like. The terminal may be a mobile phone, a desktop computer, a tablet computer, or a personal digital assistant or the like. Persons skilled in the art may understand that, the structure shown in FIG. 3A is merely a structure part related to the solutions of this application, and does not constitute a limitation to the terminal to which the solutions of this application are applied, and a specific terminal may include more or fewer components than those shown in the figure, or some components may be combined, or a different component deployment may be used.

Figure 3B:
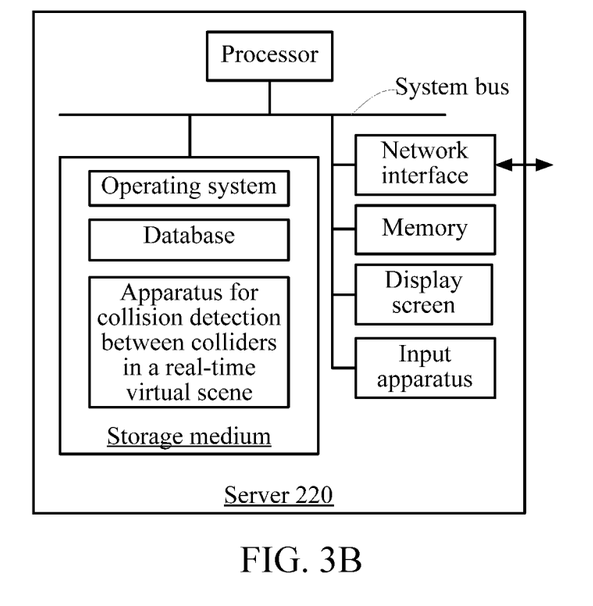
FIG. 3B is a schematic diagram of an internal structure of a server according to an embodiment.

FIG. 3B is a schematic diagram of an internal structure of the server 220 according to an embodiment. As shown in FIG. 3B, the server includes a processor, a storage medium, a memory, a network interface, a display screen, and an input apparatus that are connected by using a system bus. The storage medium of the server stores an operating system, a database, and an apparatus for collision detection between colliders in a real-time virtual scene. The database stores data about a virtual scene. The apparatus for collision detection between colliders in a real-time virtual scene is configured to implement a method for collision detection between colliders in a real-time virtual scene that is applicable to the server. The processor of the server is configured to provide computing and control capability, to support running of the entire server. The memory of the server provides a running environment for the apparatus for collision detection between colliders in a real-time virtual scene in the storage medium. The display screen of the server may be a liquid crystal display screen or an e-ink display screen or the like. The input apparatus may be a touch layer covering the display screen, or may be a button, a trackball, or a touchpad disposed on a server housing, or may be an external keyboard, touchpad, or mouse or the like. The network interface of the server is configured to communicate with an external terminal by using a network connection, for example, receive a data exchange request sent by the terminal and return data to the terminal. The server may be an independent server or a server cluster including multiple servers. Persons skilled in the art may understand that, the structure shown in FIG. 3B is merely a structure part related to the solutions of this application, and does not constitute a limitation to the server to which the solutions of this application are applied, and a specific server may include more or fewer components than those shown in the figure, or some components may be combined, or a different component deployment may be used.

In another application environment, there may be only the terminal 210 or the server 220. That is, a method for collision detection between colliders in a real-time virtual scene may need to run only on a terminal or a server. For example, a virtual object moves in a standalone real-time game scene or real-time animation scene. A user runs a downloaded standalone game on the terminal, or a tester tests a standalone game on the server.

Player-controlled virtual characters and some other moving substances (for example, a grenade and a camera) are all represented as objects of an actor type and a subtype thereof in a virtual scene. Therefore, to facilitate collision detection between colliders, collision detection is performed by means of axis alignment. To change a collider of a virtual character, the actor type is such modified that the virtual character uses a cylindrical collider and a non-character actor uses an AABB for collision detection. In the virtual scene, scene objects are mainly of two types, that is, include a BSP scene object and a component scene object. Different scene objects are classified and stored, that is, an object is classified as BSP or component. During collision detection, a collision detection entry point function Uworld:: MoveActor ( ) is used to perform coarse tailoring according to a scene object type, determine which objects of the type may collide with an introduced actor object collider, and then perform fine collision detection to obtain a returned result. The coarse tailoring means coarse collision. The fine collision detection means implementing fine collision detection between a cylindrical collider and a BSP collider (that is, a BSP scene object) according to the following method for collision detection between colliders in a real-time virtual scene. After the collision detection ends, a series of check functions are used to summarize collision detection results and transfer the results to Uworld:: MoveActor ( ) for further summary for subsequent calculation, for example, state change or damage calculation. For the BSP scene object, a cylinder rather than an AABB is used as a collider introduced into MoveActor ( ). The real-time virtual scene may include a real-time game scene, a real-time animation scene, and the like. The present disclosure is not limited to thereto.

Figure 4:
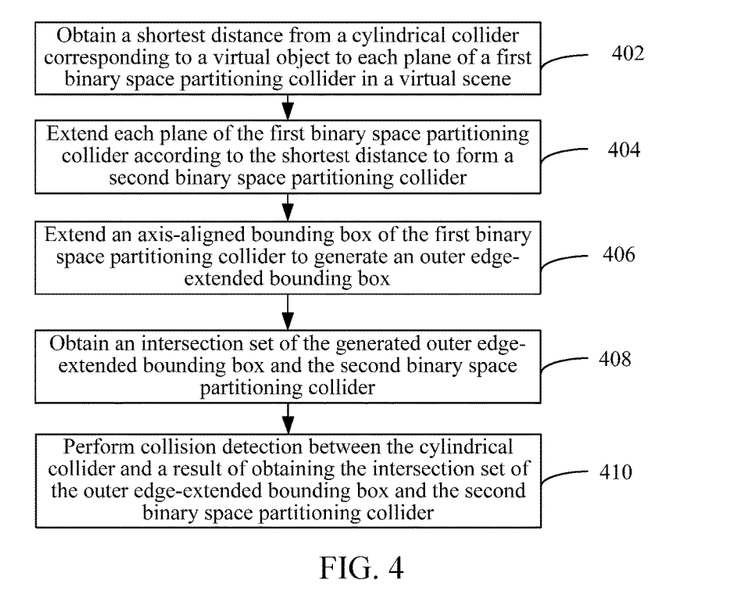
FIG. 4 is a flowchart of a method for collision detection between colliders in a real-time virtual scene according to an embodiment.

FIG. 4 is a flowchart of a method for collision detection between colliders in a real-time virtual scene according to an embodiment. As shown in FIG. 4, a method for collision detection between colliders in a real-time virtual scene, running in the application environment in FIG. 2, includes the following steps.

Step 402. Obtain a shortest distance from a cylindrical collider corresponding to a virtual object to each plane of a first BSP collider in a virtual scene.

In this embodiment, first, a BSP method is used to partition space into an "inner plane" and an "outer plane" by using a plane to form a shape. Several planes are used to partition space into several convex bodies, and then the convex bodies may be combined into a complex shape by using a Boolean operation. A CylinderPushOut ( ) function is used to measure the shortest distance from the cylindrical collider to the plane of the BSP collider.

The real-time virtual scene is a real-time game scene or a real-time animation scene or the like. The real-time game scene means a scene in a currently running game. The real-time animation scene means a scene in a currently running animation. The collision detection means detecting whether collision occurs between colliders. A collision response is generated after collision occurs, that is, after one collider collides with another collider, the one collider cannot continue to move along an original movement direction, and the movement direction of the one collider is adjusted to bypass the other collider. Alternatively, the one collider hits the other collider, and a hit response is generated. In this embodiment, the collision detection mainly means avoiding collision between one collider and another collider, and adjusting a movement direction of the one collider to bypass the other collider.

Figure 5:
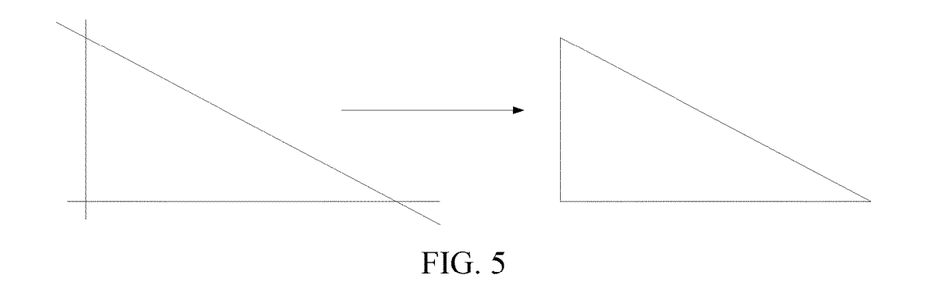
FIG. 5 is a schematic diagram of a triangle formed by three lines.

FIG. 5 is a schematic diagram of a triangle formed by three lines. As shown in FIG. 5, space partitioned by three lines on the right side is obtained by using space partitioned by the triangle on the left side, that is, "inner sides" of the three lines on the right side form a triangle area, and a situation of space partitioning using a plane may be obtained by expanding the triangle area in three-dimensional space.

Figure 6:
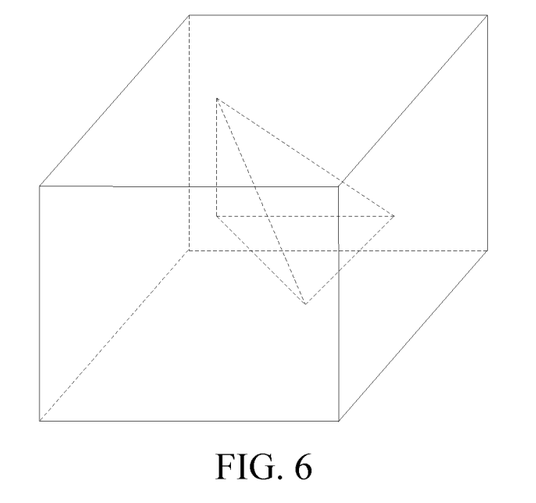
FIG. 6 is a schematic diagram of space partitioned by a triangular pyramid in three-dimensional space.

FIG. 6 is a schematic diagram of space partitioned by a triangular pyramid in three-dimensional space. As shown in FIG. 6, space is partitioned by the triangular pyramid into an area inside the triangular pyramid and an area outside the triangular pyramid.

The first BSP collider is space partitioned by means of BSP, and a plane of the first BSP collider is a surface of the space partitioned by means of BSP.

The virtual object may be a person or a substance that may move in the virtual scene. The virtual object is configured into a cylindrical collider. A collider is an object used to calculate whether collision occurs between objects, that is, an object actually involved in collision algorithm calculation. The size of the collider may be set according to the size of the virtual object in the virtual scene. For example, the virtual object is a sphere, the height of the cylindrical collider corresponding to the virtual object may be set to a diameter of the sphere, and a radius of the cylindrical collider may be set to be slightly greater than a radius of the sphere. A distance from a collider to a BSP plane that is calculated using a vertical cylinder is shorter than using an AABB, and an effect is more natural. Therefore, it is assumed that the cylindrical collider corresponding to the virtual object is certainly a vertical cylinder (in a world coordinate system). The AABB means a bounding box whose edges are all parallel to coordinate axes.

For a BSP scene object, a shortest distance from the cylindrical collider to a plane of the first BSP collider is measured first. The shortest distance is a distance from a center point of the cylindrical collider to the plane when the cylindrical collider just touches the plane (that is, the plane supports the cylindrical collider). That is, the shortest distance from the cylindrical collider corresponding to the virtual object to each plane of the first BSP collider is a distance from the center point of the cylindrical collider to a touched plane of the first BSP collider when the cylindrical collider corresponding to the virtual object touches the plane of the first BSP collider. It should be noted herein that, the plane may be any plane, and the plane may cling to a line of the cylindrical collider or support only one point.

The step of obtaining a shortest distance from a cylindrical collider corresponding to a virtual object to each plane of a first BSP collider in a virtual scene includes:

if an axial direction of the cylindrical collider corresponding to the virtual object is parallel to a plane of the first BSP collider, and the plane of the first BSP collider clings to a side line of the cylindrical collider, determining that a shortest distance from the cylindrical collider corresponding to the virtual object to the plane of the first BSP collider is the radius of the cylindrical collider; and if a plane of the first BSP collider clings to a point of the cylindrical collider, obtaining a shortest distance from the cylindrical collider to the plane of the first BSP collider according to the radius and a half height of the cylindrical collider and X, Y, and Z coordinate components of a normal vector of the plane of the first BSP collider.

Specifically, a calculation formula for obtaining a shortest distance from the cylindrical collider to a plane of the first BSP collider according to the radius and the half height of the cylindrical collider and X, Y, and Z coordinate components of a normal vector of the plane of the first BSP collider is: first obtaining a product of a square root of the X and Y coordinate components of the normal vector and the radius of the cylindrical collider, then obtaining a product of the half height of the cylindrical collider and an absolute value of the Z coordinate component of the normal vector, and finally obtaining a sum of the two products, as shown in the following formula (1):

$$S = R \cdot \sqrt{(x)^2 + (y)^2} + H \cdot |z| \qquad (1)$$

In the formula (1), S is the shortest distance from the cylindrical collider to the plane of the first BSP collider, R is the radius of the cylindrical collider, x, y, and z are three coordinate components of the normal vector of the plane in X, Y, and Z coordinate systems, H is the half height of the cylindrical collider, and |z| is the absolute value of the z component of the normal vector.

Figure 7:
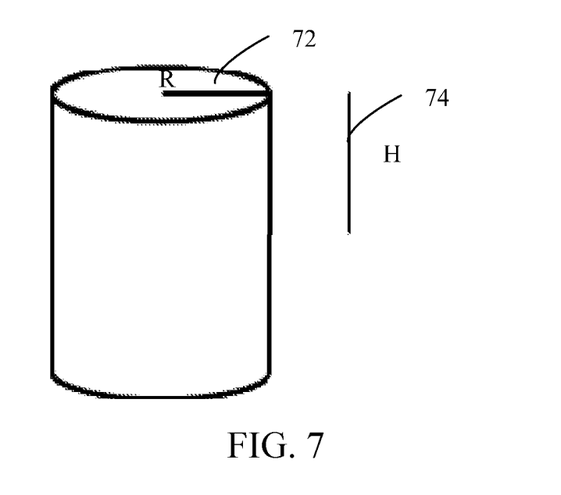
FIG. 7 is a schematic diagram of a cylindrical collider according to an embodiment.

FIG. 7 is a schematic diagram of a cylindrical collider according to an embodiment. As shown in FIG. 7, a cylinder type is used to represent a vertical cylinder, and in the cylinder type, a horizontal line 72 is used to represent a radius, and a vertical line 74 is used to represent a height, whose value is a half-height (that is, a half of a height value of the cylindrical collider).

Figure 8:
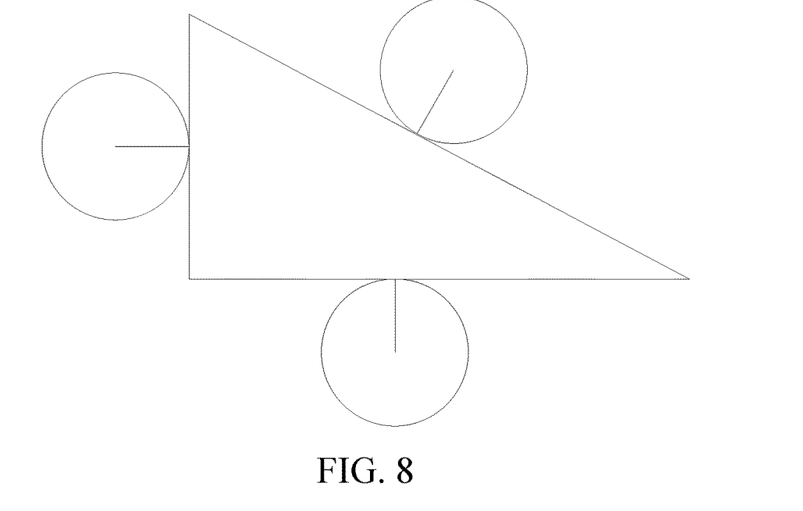
FIG. 8 is a schematic top view showing a shortest distance from a cylindrical collider to a BSP plane.

FIG. 8 is a schematic top view showing a shortest distance from a cylindrical collider to a BSP plane. As shown in FIG. 8, a cylindrical collider is a circle when overlooked, and a perpendicular line segment from the center of the circle to a BSP side (a plane is a side when overlooked) is a distance from the cylinder to the BSP plane. A distance obtained when the cylinder just touches the BSP plane is a shortest distance. In an actual three-dimensional situation, if an axial direction of the cylindrical collider is exactly parallel to the BSP plane, the plane is a side line clinging to the cylindrical collider, and in this situation, the radius of the cylindrical collider is the distance from the cylindrical collider to the BSP plane. In other situations, the plane clings to a point of the cylindrical collider. It is assumed that the cylindrical collider is always straight up, whose radius is R and half height is H, a normal vector of the plane is N (a basis vector of the plane is the same as a coordinate space basis vector of the cylindrical collider), and three components of X, Y, and Z coordinate axes of the normal vector are [x, y, z]. Then the shortest distance from the center of the cylindrical collider to the BSP plane is calculated by using the formula (1).

Figure 9:
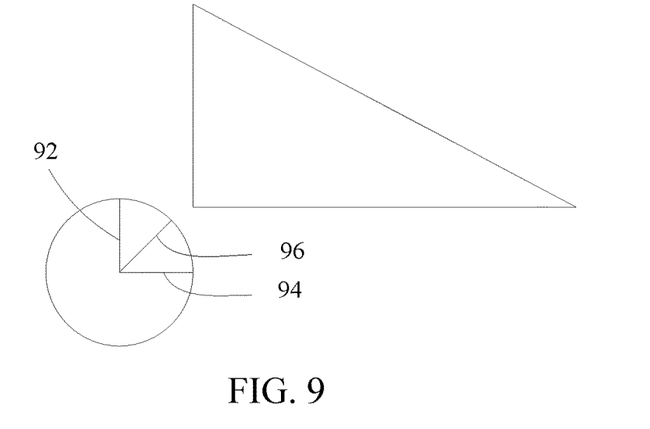
FIG. 9 is a schematic diagram of a difference between a distance from a cylindrical collider to each plane of a BSP collider and an actual distance from the cylindrical collider to the BSP collider.

FIG. 9 is a schematic diagram of a difference between a distance from a cylindrical collider to each plane of a BSP collider and an actual distance from the cylindrical collider to the BSP collider. As shown in FIG. 9, a shortest distance from the cylindrical collider to a BSP horizontal plane is represented by 92, and a shortest distance from the cylindrical collider to a BSP vertical plane is represented by 94. For a cylinder, even though a distance from the cylinder to each plane can be calculated, an actual distance from the cylinder to a corner between planes of the BSP collider, that is, the oblique line 96 in the figure, still cannot be calculated.

Step 404. Extend each plane of the first BSP collider according to the shortest distance to form a second BSP collider.

In this embodiment, the cylindrical collider is shrunk into a point (that is, a center point), and each plane of the BSP collider (the first BSP collider) is extended with an extension length being the shortest distance from the cylindrical collider to the plane, to form a new BSP collider, that is, the second BSP collider.

Figure 10:
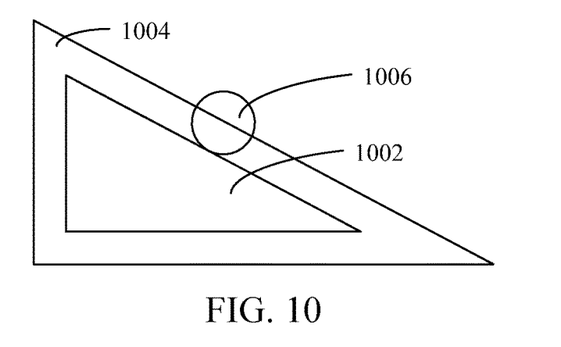
FIG. 10 is a schematic diagram of extending each plane of a BSP collider.

FIG. 10 is a schematic diagram of extending each plane of a BSP collider. As shown in FIG. 10, each plane of the first BSP collider 1002 is extended with an extension distance being the shortest distance from the cylindrical collider to the plane, the second BSP collider 1004 is formed after extension, 1002 in the figure is the first BSP collider, and 1006 in the figure is the cylindrical collider.

Figure 11:
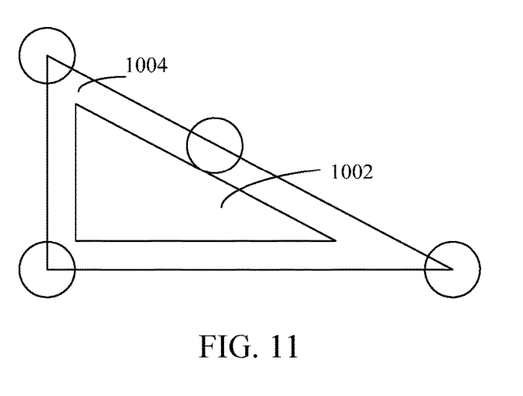
FIG. 11 is a schematic diagram of movement of a cylindrical collider along a second BSP collider.

FIG. 11 is a schematic diagram of movement of a cylindrical collider along a second BSP collider. As shown in FIG. 11, after shrunk into a point, when moving along the BSP collider obtained after extension, the cylindrical collider needs to go far from an acute angle to turn.

Step 406. Extend an AABB of the first BSP collider to generate an outer edge-extended bounding box.

In this embodiment, the step of extending an AABB of the first BSP collider to generate an outer edge-extended bounding box includes: for the AABB of the first BSP collider, scanning the entire AABB of the first BSP collider by using the center point of the cylindrical collider as a reference, to generate the outer edge-extended bounding box.

Step 408. Obtain an intersection set of the generated outer edge-extended bounding box and the second BSP collider.

Figure 12:
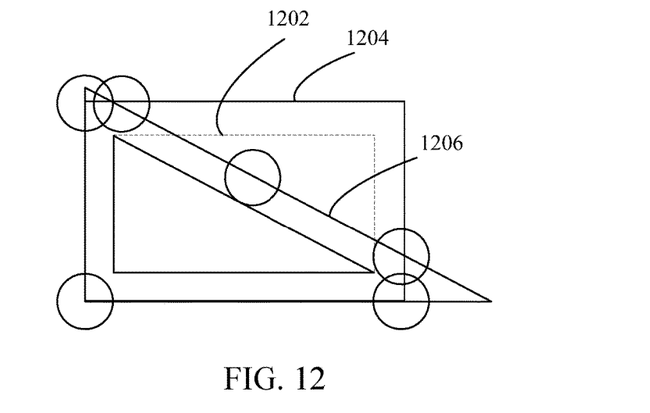
FIG. 12 is a schematic diagram of obtaining an intersection set of a second BSP collider and an outer edge-extended bounding box.

FIG. 12 is a schematic diagram of obtaining an intersection set of a second BSP collider and an outer edge-extended bounding box. As shown in FIG. 12, an AABB 1202 of the BSP collider is used as a reference, scanned, and extended to generate an outer edge-extended bounding box 1204, and then an intersection set of the outer edge-extended bounding box and the second BSP collider 1206 is obtained, so that the cylindrical collider may move around the BSP collider more natural, and a distance is reduced.

Step 410. Perform collision detection between the cylindrical collider and a result of obtaining the intersection set of the outer edge-extended bounding box and the second BSP collider.

Specifically, collision detection between the cylindrical collider and the first BSP collider is implemented by performing collision detection between the cylindrical collider and the intersection set.

In the method for collision detection between colliders in a real-time virtual scene, each plane of a first BSP collider is extended according to a shortest distance to obtain a second BSP collider, extension is performed for the first BSP collider by using a center point of a cylindrical collider as a reference to obtain an outer edge-extended bounding box, an intersection set of the second BSP collider and the outer edge-extended bounding box is obtained, and collision detection between the cylindrical collider and the first BSP collider is implemented by means of collision between the cylindrical collider and the intersection set. The collision detection is performed to avoid collision between two colliders. Compared with conventional collision detection between colliders based on two AABBs, during collision detection between the cylindrical collider and an AABB of the first BSP collider, a virtual object does not need to be controlled to move its whole body out to bypass a corner of the first BSP collider like an AABB does, and the cylindrical collider may smoothly bypass the corner, that is, the corner may be bypassed by moving a shorter distance. This reduces a movement distance, improves movement efficiency at a same movement speed, and implements more fluent operations due to smooth movement.

Figure 13:
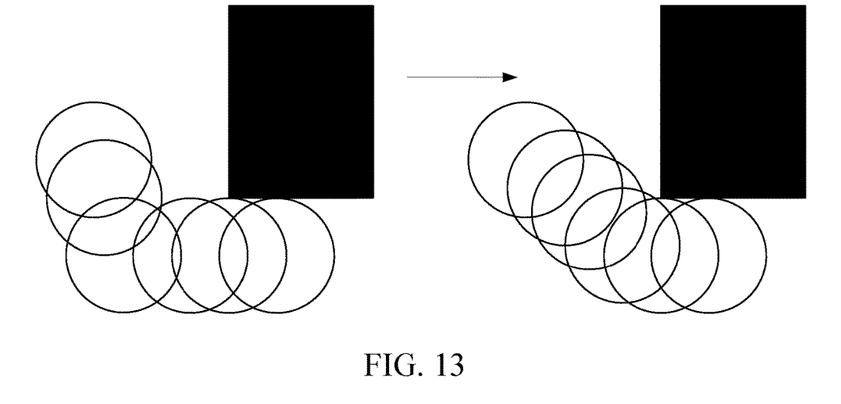
FIG. 13 is a schematic diagram of a theoretical result of performing collision detection by using a cylindrical collider.

FIG. 13 is a schematic diagram of an effect of using a conventional algorithm to perform collision detection by using a cylindrical collider and a theoretical result of collision detection in the present disclosure. As shown in FIG. 13, the left diagram shows that collision detection is performed according to a conventional algorithm by using a cylindrical collider, in which the cylindrical collider still needs to move its whole body out to move along a lower edge of the black collider; the right diagram shows a theoretical result that can be achieved after a cylindrical collider and the foregoing method for collision detection between colliders in a real-time virtual scene are used, in which the cylindrical collider moves a shorter distance in the movement process, movement efficiency is high, and operations are fluent. In an embodiment, the method for collision detection between colliders in a real-time virtual scene further includes: after the step of extending an AABB of the first BSP collider to generate an outer edge-extended bounding box, adding a bevel to each of four corners of the outer edge-extended bounding box.

A distance from a plane intersection line in the first BSP collider and corresponding to a bevel of the outer edge-extended bounding box to the bevel is the radius of the cylindrical collider.

Optionally, bevels are added to four corners of the outer edge-extended bounding box, and then the intersection set of the outer edge-extended bounding box and the second BSP collider is obtained, so that the intersection set also has bevels, and round corners are simulated by using the bevels, which may make it more convenient for the cylindrical collider to bypass the corner, further reduce the distance, and improve the movement efficiency.

Figure 14:
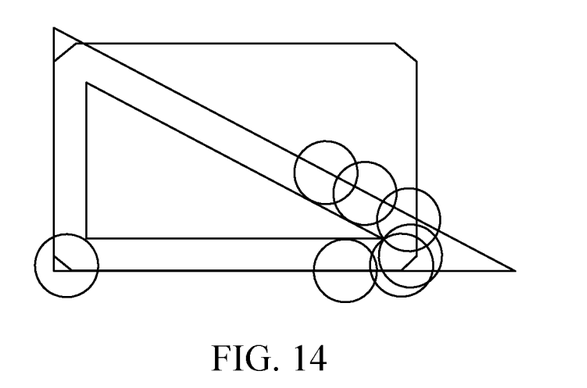
FIG. 14 is a schematic diagram of adding bevels to four corners of an outer edge-extended bounding box according to an embodiment.

FIG. 14 is a schematic diagram of adding bevels to four corners of an outer edge-extended bounding box according to an embodiment. As shown in FIG. 14, bevels are added to the four corners of the outer edge-extended bounding box as chamfered surfaces, that is, right angles at the four corners of the outer edge-extended bounding box are cut to form bevels. When the right angles are cut, an acute angle of a triangle formed on a plane by projection of a cut part is 45 degrees.

In an embodiment, the method for collision detection between colliders in a real-time virtual scene further includes: after the step of extending an AABB of the first BSP collider to generate an outer edge-extended bounding box, adding a cambered surface to each of four corners of the outer edge-extended bounding box.

A shortest distance from a plane intersection line in the first BSP collider and corresponding to a cambered surface of the outer edge-extended bounding box to the cambered surface is the radius of the cylindrical collider.

Cambered surfaces are added to four corners of the outer edge-extended bounding box, and then the intersection set of the outer edge-extended bounding box and the second BSP collider is obtained, so that the intersection set also has cambered surfaces. The cambered surfaces match the cylindrical collider better, which may make it more convenient for the cylindrical collider to bypass the corner, further reduce the distance, and improve the movement efficiency.

An implementation process of the method for collision detection between colliders in a real-time virtual scene is described by using a specific application scene. A real-time game scene is used as an example, the cylindrical collider is a virtual character, and the first BSP collider is a wall. Referring to FIG. 14, circles are two-dimensional projection of the cylindrical collider, and the triangle is two-dimensional projection of the first BSP collider. A collision detection process includes:

(1) obtaining a shortest distance from the cylindrical collider corresponding to the virtual character to each plane of the first BSP collider in the real-time game scene;

(2) extending each plane of the first BSP collider according to the shortest distance to form a second BSP collider;

(3) extending an AABB of the first BSP collider to generate an outer edge-extended bounding box, and adding a cambered surface to each of four corners of the outer edge-extended bounding box;

(4) obtaining an intersection set of the generated outer edge-extended bounding box and the second BSP collider; and (5) performing collision detection between the cylindrical collider and a result of obtaining the intersection set of the outer edge-extended bounding box and the second BSP collider.

The collision detection refers to detecting whether collision occurs between colliders. When collision occurs, an original movement direction of the cylindrical collider is adjusted, to bypass the second BSP collider.

A movement path of the cylindrical collider may be obtained by performing collision detection between the projected circles of the cylindrical collider and the intersection set of the outer edge-extended bounding box and the second BSP collider, as shown in FIG. 14.

Figure 15:
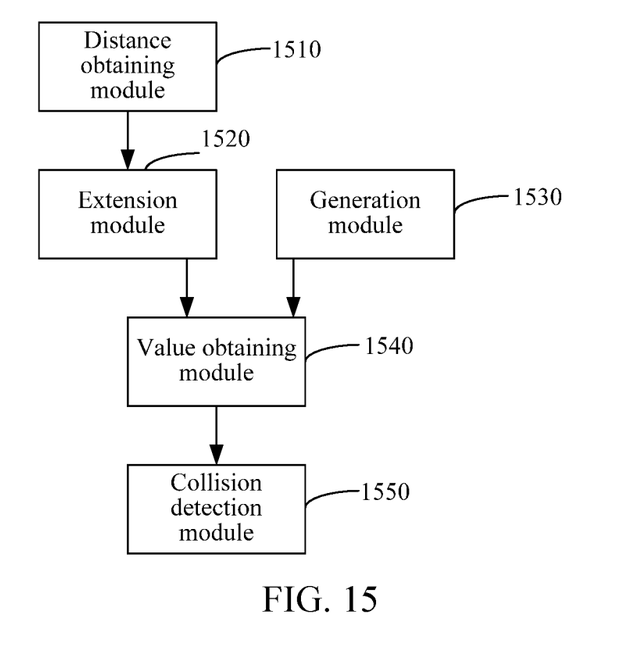
FIG. 15 is a structural block diagram of an apparatus for collision detection between colliders in a real-time virtual scene according to an embodiment.

FIG. 15 is a structural block diagram of an apparatus for collision detection between colliders in a real-time virtual scene according to an embodiment. The apparatus for collision detection between colliders in a real-time virtual scene in FIG. 15 is a functional architecture constructed for implementing the method for collision detection between colliders in a real-time virtual scene in FIG. 4. Division of functional modules is not limited to that described in this embodiment, and may be implemented in another manner. As shown in FIG. 15, the apparatus for collision detection between colliders in a real-time virtual scene includes a distance obtaining module 1510, an extension module 1520, a generation module 1530, a value obtaining module 1540, and a collision detection module 1550.

The distance obtaining module 1510 is configured to obtain a shortest distance from a cylindrical collider corresponding to a virtual object to each plane of a first BSP collider in a virtual scene.

In this embodiment, first, a BSP method is used to partition space into an "inner plane" and an "outer plane" by using a plane to form a shape. Several planes are used to partition space into several convex bodies, and then the convex bodies may be combined into a complex shape by using a Boolean operation.

The first BSP collider is space partitioned by means of BSP, and a plane of the first BSP collider is a surface of the space partitioned by means of BSP.

The virtual object may be a person or a substance that may move in the virtual scene. The virtual object is configured into a cylindrical collider. A collider is a substance used to calculate whether collision occurs between substances, that is, a substance actually involved in collision algorithm calculation.

The shortest distance from the cylindrical collider corresponding to the virtual object to each plane of the first BSP collider is a distance from a center point of the cylindrical collider to a touched plane of the first BSP collider when the cylindrical collider corresponding to the virtual object touches the plane of the first BSP collider.

In this embodiment, the distance obtaining module 1510 is further configured to: if an axial direction of the cylindrical collider corresponding to the virtual object is parallel to a plane of the first BSP collider, and the plane of the first BSP collider clings to a side line of the cylindrical collider, determine that a shortest distance from the cylindrical collider corresponding to the virtual object to the plane of the first BSP collider is a radius of the cylindrical collider; and if a plane of the first BSP collider clings to a point of the cylindrical collider, obtain a shortest distance from the cylindrical collider to the plane of the first BSP collider according to a radius and a half height of the cylindrical collider and X, Y, and Z coordinate components of a normal vector of the plane of the first BSP collider.

Specifically, a calculation formula for obtaining a shortest distance from the cylindrical collider to a plane of the first BSP collider according to the radius and the half height of the cylindrical collider and X, Y, and Z coordinate components of a normal vector of the plane of the first BSP collider is: first obtaining a product of a square root of the X and Y coordinate components of the normal vector and the radius of the cylindrical collider, then obtaining a product of the half height of the cylindrical collider and an absolute value of the Z coordinate component of the normal vector, and finally obtaining a sum of the two products, as shown in the following formula (1):

$$S = R \cdot \sqrt{(x)^2 + (y)^2} + H \cdot |z| \quad (1)$$

In the formula (1), S is the shortest distance from the cylindrical collider to the plane of the first BSP collider, R is the radius of the cylindrical collider, x, y, and z are three coordinate components of the normal vector of the plane in X, Y, and Z coordinate systems, H is the half height of the cylindrical collider, and |z| is the absolute value of the z component of the normal vector.

The extension module 1520 is configured to extend each plane of the first BSP collider according to the shortest distance to form a second BSP collider.

In this embodiment, the cylindrical collider is shrunk into a point (that is, the center point), and each plane of the BSP collider (the first BSP collider) is extended with an extension length being the shortest distance from the cylindrical collider to the plane, to form a new BSP collider, that is, the second BSP collider.

The generation module 1530 is configured to extend an AABB of the first BSP collider to generate an outer edge-extended bounding box.

Specifically, the generation module 1530 is further configured to: for the AABB of the first BSP collider, scan the entire AABB of the first BSP collider by using the center point of the cylindrical collider as a reference, to generate the outer edge-extended bounding box.

The value obtaining module 1540 is configured to obtain an intersection set of the generated outer edge-extended bounding box and the second BSP collider.

The collision detection module 1550 is configured to perform collision detection between the cylindrical collider and a result of obtaining the intersection set of the outer edge-extended bounding box and the second BSP collider.

Specifically, collision detection between the cylindrical collider and the first BSP collider is implemented by means of collision between the cylindrical collider and the intersection set.

In the apparatus for collision detection between colliders in a real-time virtual scene, each plane of a first BSP collider is extended according to a shortest distance to obtain a second BSP collider, extension is performed for the first BSP collider by using a center point of a cylindrical collider as a reference to obtain an outer edge-extended bounding box, an intersection set of the second BSP collider and the outer edge-extended bounding box is obtained, and collision detection between the cylindrical collider and the first BSP collider is implemented by means of collision between the cylindrical collider and the intersection set. The collision detection is performed to avoid collision between colliders. Compared with conventional collision detection between colliders based on two AABBs, during collision detection between the cylindrical collider and an AABB of the first BSP collider, a virtual object does not need to be controlled to move its whole body out to bypass a corner of the first BSP collider like an AABB does, and the cylindrical collider may smoothly bypass the corner, that is, the corner may be bypassed by moving a shorter distance. This reduces a movement distance, improves movement efficiency at a same movement speed, and implements more fluent operations due to smooth movement.

Figure 16:
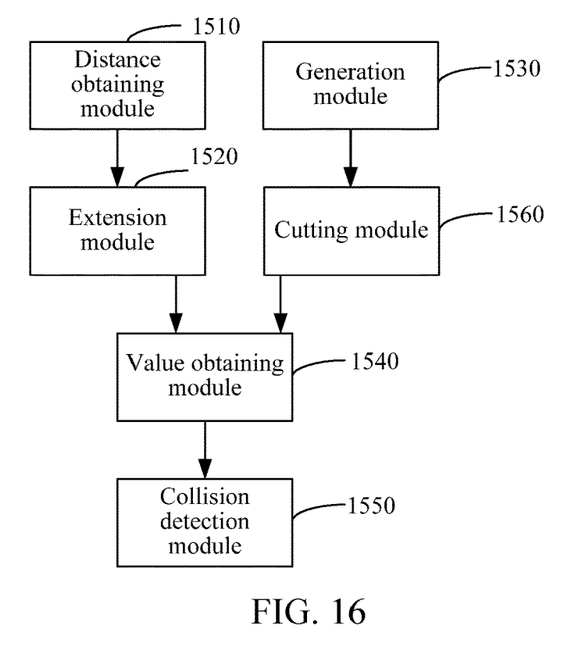
FIG. 16 is a structural block diagram of an apparatus for collision detection between colliders in a real-time virtual scene according to another embodiment.

FIG. 16 is a structural block diagram of an apparatus for collision detection between colliders in a real-time virtual scene according to an embodiment. As shown in FIG. 16, the apparatus for collision detection between colliders in a real-time virtual scene includes a distance obtaining module 1510, an extension module 1520, a generation module 1530, a value obtaining module 1540, and a collision detection module 1550, and further includes a cutting module 1560.

The cutting module 1560 is configured to: after the AABB of the first BSP collider is extended to generate the outer edge-extended bounding box, add a bevel to each of four corners of the outer edge-extended bounding box.

A distance from a plane intersection line in the first BSP collider and corresponding to a bevel of the outer edge-extended bounding box to the bevel is the radius of the cylindrical collider.

Bevels are added to four corners of the outer edge-extended bounding box, and then the intersection set of the outer edge-extended bounding box and the second BSP collider is obtained, so that the intersection set also has bevels, and round corners are simulated by using the bevels, which may make it more convenient for the cylindrical collider to bypass the corner, further reduce the distance, and improve the movement efficiency.

Figure 17:
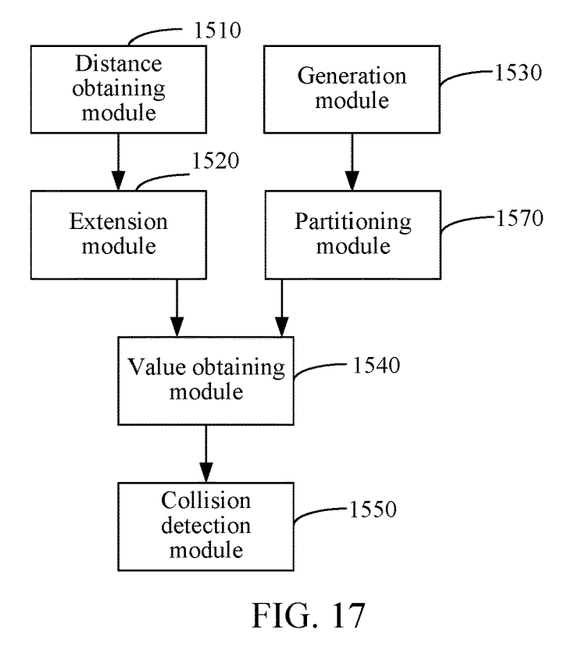
FIG. 17 is a structural block diagram of an apparatus for collision detection between colliders in a real-time virtual scene according to another embodiment.

FIG. 17 is a structural block diagram of an apparatus for collision detection between colliders in a real-time virtual scene according to another embodiment. As shown in FIG. 17, the apparatus for collision detection between colliders in a real-time virtual scene includes a distance obtaining module 1510, an extension module 1520, a generation module 1530, a value obtaining module 1540, and a collision detection module 1550, and further includes a partitioning module 1570.

The partitioning module 1570 is configured to: after the AABB of the first BSP collider is extended to generate the outer edge-extended bounding box, add a cambered surface to each of four corners of the outer edge-extended bounding box.

A shortest distance from a plane intersection line in the first BSP collider and corresponding to a cambered surface of the outer edge-extended bounding box to the cambered surface is the radius of the cylindrical collider.

Cambered surfaces are added to four corners of the outer edge-extended bounding box, and then the intersection set of the outer edge-extended bounding box and the second BSP collider is obtained, so that the intersection set also has cambered surfaces. The cambered surfaces match the cylindrical collider better, which may make it more convenient for the cylindrical collider to bypass the corner, further reduce the distance, and improve the movement efficiency.

A person of ordinary skill in the art may understand that all or some of the processes of the methods in the foregoing embodiments may be implemented by a computer program instructing relevant hardware. The program may be stored in a non-volatile computer readable storage medium. When the program is executed, processes of the foregoing method embodiments may be performed. The storage medium may be a magnetic disk, an optical disc, a read-only memory (ROM), or the like.

The described embodiments are merely some embodiments of the present invention, which are specific and detailed. However, it should not be understood as a limitation to the patent scope of the present disclosure. It should be noted that, persons of ordinary skill in the art may further make some variations and improvements without departing from the concept of the present disclosure, and the variations and improvements belong to the protection scope of the present disclosure. Therefore, the protection scope of the present disclosure shall be subject to the protection scope of the appended claims.

What is claimed is:

1. A method for collision detection between colliders in a real-time virtual scene, comprising:
    obtaining a shortest distance from a cylindrical collider corresponding to a virtual object to each plane of a first binary space partitioning collider in a virtual scene;
    extending each plane of the first binary space partitioning collider according to the shortest distance to form a second binary space partitioning collider;
    extending an axis-aligned bounding box of the first binary space partitioning collider to generate an outer edge-extended bounding box;
    obtaining an intersection set of the generated outer edge-extended bounding box and the second binary space partitioning collider; and
    performing collision detection between the cylindrical collider and a result of obtaining the intersection set of the outer edge-extended bounding box and the second binary space partitioning collider.

2. The method according to claim 1, after extending an axis-aligned bounding box of the first binary space partitioning collider to generate an outer edge-extended bounding box, further comprising:
    adding a bevel to each of four corners of the outer edge-extended bounding box.

3. The method according to claim 2, wherein a distance from a plane intersection line in the first binary space partitioning collider and corresponding to a bevel of the outer edge-extended bounding box to the bevel is a radius of the cylindrical collider.

4. The method according to claim 1, after extending an axis-aligned bounding box of the first binary space partitioning collider to generate an outer edge-extended bounding box, further comprising:
    adding a cambered surface to each of four corners of the outer edge-extended bounding box.

5. The method according to claim 4, wherein a shortest distance from a plane intersection line in the first binary space partitioning collider and corresponding to a cambered surface of the outer edge-extended bounding box to the cambered surface is a radius of the cylindrical collider.

6. The method according to claim 1, wherein the shortest distance from the cylindrical collider corresponding to the virtual object to each plane of the first binary space partitioning collider is a distance from a center point of the cylindrical collider to a touched plane of the first binary space partitioning collider when the cylindrical collider corresponding to the virtual object touches the plane of the first binary space partitioning collider.

7. The method according to claim 1, wherein the obtaining a shortest distance from a cylindrical collider corresponding to a virtual object to each plane of a first binary space partitioning collider in a virtual scene comprises:
    if an axial direction of the cylindrical collider corresponding to the virtual object is parallel to a plane of the first binary space partitioning collider, and the plane of the first binary space partitioning collider clings to a side line of the cylindrical collider, determining that a shortest distance from the cylindrical collider corresponding to the virtual object to the plane of the first binary space partitioning collider is a radius of the cylindrical collider; and
    if a plane of the first binary space partitioning collider clings to a point of the cylindrical collider, obtaining a shortest distance from the cylindrical collider to the plane of the first binary space partitioning collider according to a radius and a half height of the cylindrical collider and X, Y, and Z coordinate components of a normal vector of the plane of the first binary space partitioning collider.

8. The method according to claim 1, wherein the extending an axis-aligned bounding box of the first binary space partitioning collider to generate an outer edge-extended bounding box comprises:
    for the axis-aligned bounding box of the first binary space partitioning collider, scanning the entire axis-aligned bounding box of the first binary space partitioning collider by using a center point of the cylindrical collider as a reference, to generate the outer edge-extended bounding box.

9. A terminal, comprising a memory and a processor, the memory storing computer readable instructions for the processor, and the processor being configured for:
    obtaining a shortest distance from a cylindrical collider corresponding to a virtual object to each plane of a first binary space partitioning collider in a virtual scene;
    extending each plane of the first binary space partitioning collider according to the shortest distance to form a second binary space partitioning collider;
    extending an axis-aligned bounding box of the first binary space partitioning collider to generate an outer edge-extended bounding box;
    obtaining an intersection set of the generated outer edge-extended bounding box and the second binary space partitioning collider; and
    performing collision detection between the cylindrical collider and a result of obtaining the intersection set of the outer edge-extended bounding box and the second binary space partitioning collider.

10. The terminal according to claim 9, wherein, after extending an axis-aligned bounding box of the first binary space partitioning collider to generate an outer edge-extended bounding box, the processor is further configured for:
    adding a bevel to each of four corners of the outer edge-extended bounding box.

11. The terminal according to claim 10, wherein a distance from a plane intersection line in the first binary space partitioning collider and corresponding to a bevel of the outer edge-extended bounding box to the bevel is a radius of the cylindrical collider.

12. The terminal according to claim 9, wherein, after extending an axis-aligned bounding box of the first binary space partitioning collider to generate an outer edge-extended bounding box, the processor is further configured for:

adding a cambered surface to each of four corners of the outer edge-extended bounding box.

13. The terminal according to claim 12, wherein a shortest distance from a plane intersection line in the first binary space partitioning collider and corresponding to a cambered surface of the outer edge-extended bounding box to the cambered surface is a radius of the cylindrical collider.

14. The terminal according to claim 9, wherein the shortest distance from the cylindrical collider corresponding to the virtual object to each plane of the first binary space partitioning collider is a distance from a center point of the cylindrical collider to a touched plane of the first binary space partitioning collider when the cylindrical collider corresponding to the virtual object touches the plane of the first binary space partitioning collider.

15. The terminal according to claim 9, wherein the obtaining a shortest distance from a cylindrical collider corresponding to a virtual object to each plane of a first binary space partitioning collider in a virtual scene comprises:

if an axial direction of the cylindrical collider corresponding to the virtual object is parallel to a plane of the first binary space partitioning collider, and the plane of the first binary space partitioning collider clings to a side line of the cylindrical collider, determining that a shortest distance from the cylindrical collider corresponding to the virtual object to the plane of the first binary space partitioning collider is a radius of the cylindrical collider; and if a plane of the first binary space partitioning collider clings to a point of the cylindrical collider, obtaining a shortest distance from the cylindrical collider to the plane of the first binary space partitioning collider according to a radius and a half height of the cylindrical collider and X, Y, and Z coordinate components of a normal vector of the plane of the first binary space partitioning collider.

16. The terminal according to claim 9, wherein the extending an axis-aligned bounding box of the first binary space partitioning collider to generate an outer edge-extended bounding box comprises:

for the axis-aligned bounding box of the first binary space partitioning collider, scanning the entire axis-aligned bounding box of the first binary space partitioning collider by using a center point of the cylindrical collider as a reference, to generate the outer edge-extended bounding box.

17. A non-transitory computer-readable storage medium storing computer executable instructions for, when executed by one or more processors, performing a method for collision detection between colliders in a real-time virtual scene, the method comprising:

obtaining a shortest distance from a cylindrical collider corresponding to a virtual object to each plane of a first binary space partitioning collider in a virtual scene;

extending each plane of the first binary space partitioning collider according to the shortest distance to form a second binary space partitioning collider;

extending an axis-aligned bounding box of the first binary space partitioning collider to generate an outer edge-extended bounding box;

obtaining an intersection set of the generated outer edge-extended bounding box and the second binary space partitioning collider; and performing collision detection between the cylindrical collider and a result of obtaining the intersection set of the outer edge-extended bounding box and the second binary space partitioning collider.

18. The non-transitory computer-readable storage medium according to claim 17, after extending an axis-aligned bounding box of the first binary space partitioning collider to generate an outer edge-extended bounding box, the method further comprising:

adding a bevel to each of four corners of the outer edge-extended bounding box.

19. The non-transitory computer-readable storage medium according to claim 18, wherein a distance from a plane intersection line in the first binary space partitioning collider and corresponding to a bevel of the outer edge-extended bounding box to the bevel is a radius of the cylindrical collider.

20. The non-transitory computer-readable storage medium according to claim 17, after extending an axis-aligned bounding box of the first binary space partitioning collider to generate an outer edge-extended bounding box, the method further comprising:

adding a cambered surface to each of four corners of the outer edge-extended bounding box.

* * * * *